United States Patent
Kittler et al.

(10) Patent No.: US 7,370,553 B2
(45) Date of Patent: May 13, 2008

(54) STEERING SPINDLE ARRANGEMENT AND A METHOD FOR THE PRODUCTION THEREOF

(75) Inventors: Holger Kittler, Hamburg (DE); Hanno Lox, Elmshorn (DE); Christian Spielmannleitner, Hamburg (DE)

(73) Assignee: DaimlerChrysler AG, Stuttgart (DE)

( * ) Notice: Subject to any disclaimer, the term of this patent is extended or adjusted under 35 U.S.C. 154(b) by 680 days.

(21) Appl. No.: 10/416,232

(22) PCT Filed: Nov. 3, 2001

(86) PCT No.: PCT/EP01/12752

§ 371 (c)(1),
(2), (4) Date: Feb. 13, 2004

(87) PCT Pub. No.: WO02/38431

PCT Pub. Date: May 16, 2002

(65) Prior Publication Data

US 2004/0177715 A1 Sep. 16, 2004

(30) Foreign Application Priority Data

Nov. 9, 2000 (DE) .............................. 100 55 608

(51) Int. Cl.
*B62D 1/19* (2006.01)
(52) U.S. Cl. ........................................ 74/492; 280/777
(58) Field of Classification Search ................. 74/492, 74/493; 280/777
See application file for complete search history.

(56) References Cited

U.S. PATENT DOCUMENTS

| | | | |
|---|---|---|---|
| 3,396,599 A | 8/1968 | Altmann | |
| 4,572,022 A | 2/1986 | Mettler | |
| 5,235,734 A * | 8/1993 | DuRocher et al. | ......... 29/455.1 |
| 5,476,284 A | 12/1995 | DuRocher et al. | |

(Continued)

FOREIGN PATENT DOCUMENTS

DE 1430946 12/1968

(Continued)

OTHER PUBLICATIONS

Kenneth Mason Publications, "Shape Memory Alloy Ring Fastened Energy Absorbing Steering Columns and Devices" Research Disclosure, No. 371, Mar. 1, 1995, p. 231.

(Continued)

*Primary Examiner*—William C Joyce
(74) *Attorney, Agent, or Firm*—Crowell & Moring LLP

(57) ABSTRACT

A steering spindle arrangement having a first component remote from the steering wheel and a second component near the steering wheel, with one of the mutually facing ends of the one component dipping into the hollow end of the other component, and with the two ends being connected frictionally to each other, is disclosed. Furthermore, a method for producing the arrangement is disclosed. In order, in a simple manner, to obtain as specific a definition as possible of the absorption by the steering spindle of the deformation energy in the event of a crash while ensuring that the arrangement is durable and directly transmits the steering moment, it is provided that the walls of the two ends lie directly on each other in the form of a press fit over the region of the frictional connection.

9 Claims, 2 Drawing Sheets

U.S. PATENT DOCUMENTS

| | | | | |
|---|---|---|---|---|
| 6,068,296 | A | * | 5/2000 | Tomaru et al. ............. 280/777 |
| 6,345,842 | B1 | * | 2/2002 | Igarashi et al. ............. 280/775 |
| 6,530,599 | B1 | * | 3/2003 | Oka ........................... 280/777 |

FOREIGN PATENT DOCUMENTS

| | | |
|---|---|---|
| DE | 1931390 | 1/1970 |
| DE | 2232836 | 2/1973 |
| DE | 32 23 004 A1 | 1/1983 |
| DE | 297 03 843 U1 | 7/1997 |
| DE | 19750391 | 6/1998 |
| DE | 19820124 | 2/1999 |
| DE | 198 39 353 C1 | 11/1999 |
| DE | 695 22 781 T2 | 5/2002 |
| EP | 0041835 | 12/1981 |
| EP | 0 713 820 A1 | 5/1996 |
| GB | 1270684 | 4/1972 |
| GB | 2347389 | 9/2000 |
| WO | WO 98/39106 | 9/1998 |

OTHER PUBLICATIONS

Search Report.

* cited by examiner

STEERING SPINDLE ARRANGEMENT AND A METHOD FOR THE PRODUCTION THEREOF

BACKGROUND AND SUMMARY OF THE INVENTION

The invention relates to a steering spindle arrangement and to a method for producing it.

A steering spindle arrangement of generic type and a production method of the generic type are disclosed in German Patent Document No. DE-A 14 30 946. The arrangement which is described comprises two telescopic steering spindle components which are fixed frictionally on each other, with the steering moment transmitted by the steering wheel to the inner component being passed on to the outer spindle component by the frictional connection. If there is an axial impact in the event of a crash, the two components are pushed one inside the other, with impact energy being consumed by the friction. The frictional connection is formed in different ways, namely, first, by means of a tolerance ring which is arranged in a groove on the inner circumference of the outer component and, secondly by a plastic layer which is placed in the plug-in position of the components and imparts the frictional connection between the components. As a further variant, those ends of the components which communicate with each other have spring-loaded form-fitting elements which are provided with bevels, engage one inside the other and, in the use position of the components, are caused by the compression spring to slide on the bevels in such a manner that a radial pressing of the inner component against the outer component is produced. In addition, those ends of the components which are connected to each other are locked in a form-fitting manner in the circumferential direction by means of their polygonal shape, as a result of which the steering torque can be transmitted even better.

However, one disadvantage of the known arrangement is that the arrangement of a tolerance ring is relatively complicated, since the latter has to be specially adapted to the cross-sectional dimensioning of the outer steering spindle component and requires a securing device (receiving groove) which complicates the production of the steering spindle. Furthermore, the tolerance ring itself has manufacturing tolerances which, in comparison to the individual steering spindles, result in the travel of the inner component being dispersed and therefore to different levels of energy absorption in vehicle collisions. This means that—contrary to the required safety conditions—it is not possible to establish a specific, uniform safety standard for the steering spindle from the outset. The plastic-layer variant shown is less practicable, since the plastic layer wears very rapidly and over time transmits the steering moment very imprecisely to the outer component, which results in a risk to the driver. In addition, the method for producing the frictional connection with the layer is awkward, since the layer has to be placed over a very narrow annular gap between the spindle components. This means a method step for producing the connection, in which it cannot be assessed whether the layer is completely formed and can thus provide the expected frictional connection level. The other variant having the bevelled form-fitting elements is also very complicated in terms of the design and installation. In addition, in a crash the driver might be subjected to a spontaneous, unbraked impact, since the form-fitting element of the other component is fastened to it and thus prevents displacement of the inner component.

The invention is based on the object of developing a generic arrangement to the effect that, in a simple manner, as specific a definition as possible of the absorption by the steering spindle of the deformation energy in the event of a crash is obtained while ensuring that the arrangement is durable and directly transmits the steering moment. Furthermore, it is the object of the invention to develop a generic method for producing the arrangement to the effect that it can be carried out with only a little outlay and reliably.

Owing to the invention, all of the structural elements which impart the frictional connection between the inner and outer steering spindle components are omitted in the arrangement. This simplifies the construction of the arrangement on account of the reduction in the number of parts. Furthermore, no manufacturing tolerances and/or wear of the structural elements arise, with the result that a specific definition of the absorption by the steering spindle of the deformation energy in the event of a crash is possible. The press fit produced by pressing together the two steering spindle components can be reliably produced with little outlay by various methods, for example by magnetic pulse deformation or thermal shrinking-on of the outer component in the plug-in position of the two components. The direct contact of the component walls against each other results in direct transfer by the arrangement of the steering moment. The press fit furthermore ensures that the arrangement is durable in normal operation and is able, owing to the high frictional force of the joining partners, i.e., the two steering spindle components, to absorb large displacement forces in the event of a crash. The frictional connection can be set in a specific manner by selecting the process parameters of the production methods, with it being possible for a certain axial displacement force to be established for a crash situation and hence for a uniform force profile to be produced. This selection enables the force profile to be varied as desired in accordance with requirements.

BRIEF DESCRIPTION OF THE DRAWINGS

The invention is moreover explained in greater detail below with reference to an exemplary embodiment illustrated in the drawings, in which.

DETAILED DESCRIPTION OF THE DRAWINGS

Figure 1:
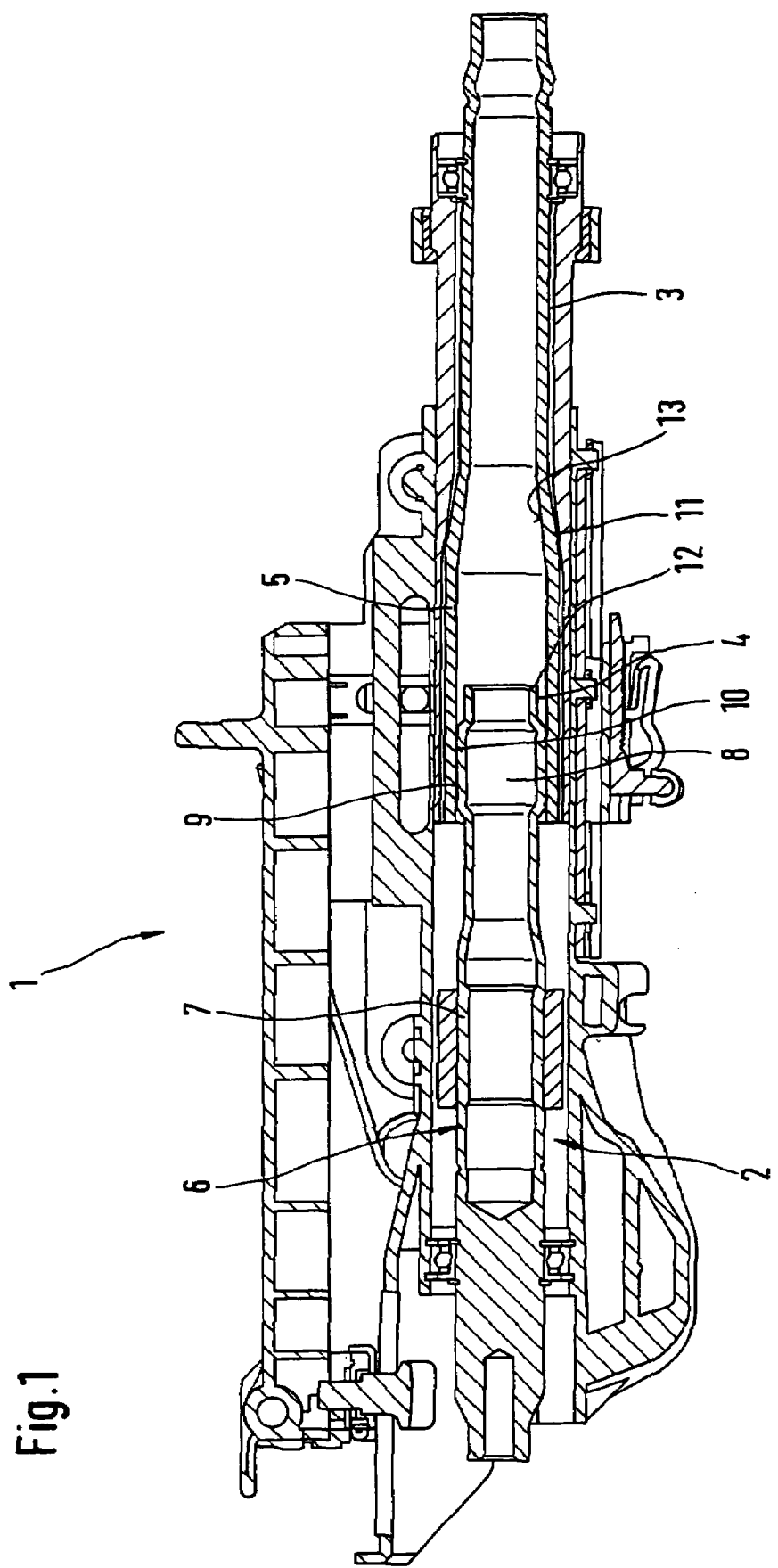
FIG. 1 shows a steering spindle arrangement according to the invention in a lateral longitudinal section.

FIG. 1 illustrates a steering spindle arrangement 1 which is composed, among other things, of a first component 2 remote from the steering wheel and a second component 3 near the steering wheel, with the components 2 and 3 being arranged colinearly with respect to each other. The component 2 remote from the steering wheel dips here with its end 4, which faces the component 3, into a hollow end 5 of the component 3. As an alternative to this design, the end 5, which does not then have to be made hollow, can also dip into the then hollow end 4 of the component 2. Although it is possible to form the respectively dipping end 4 or 5, and at the same time the component 2 or 3 belonging to it, from rod-like solid material, it is advantageous, for lightweight construction reasons, for the dipping ends 4 or 5 and/or the associated component 2 or 3 to be of hollow or tubular design. All in all, in the exemplary embodiment shown, the two components 2 and 3 are of tubular design, simply for weight reasons and from the point of view of being able to produce the components 2 and 3 cost-effectively and with as little complexity as possible. For example, tubes with a longitudinally welded seam which are drawn or produced from blanks can be provided here. The component 2 has a radial expansion 7 at its end 6 facing the steering gear and a radial expansion 8 at its dipping end 4. With the outer circumference of its expansion 8, the end 4 bears frictionally against the inner circumference of the end 5, specifically in such a manner that the corresponding walls 9 and 10 of the two ends 4 and 5 lie directly on each other in the form of a press fit over the region of the frictional connection. The end 5 of the component 3 near the steering wheel has a larger diameter than the rest of the component 3. The formation of the diameter is brought about starting from a tube round having a diameter corresponding to the diameter of the end 5, by rotary swaging, with the end 5 being connected to the other end via a conically tapering section 11. However, it is likewise conceivable as an alternative for the end 5 to be formed as a turned-up area of the tubular component 3 in an advantageous manner in terms of method by means of internal high pressure deformation and for it to merge with a conical section 11 into the remaining, unexpanded component 3. The components 2 and 3 can be formed with a circular cross section, which simplifies the production complexity.

Figure 2:
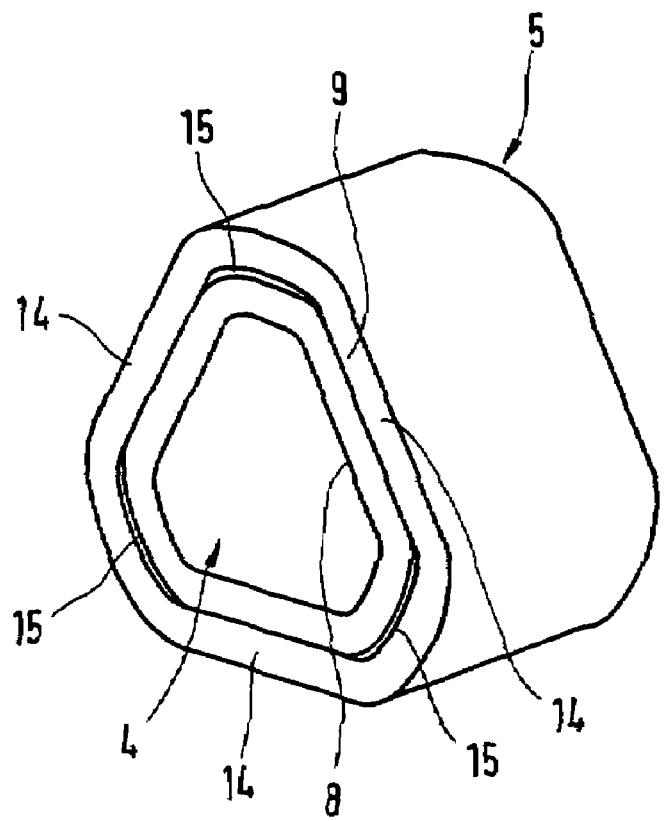
FIG. 2 shows part of the steering spindle arrangement from FIG. 1 in a perspective illustration.
Figure 3:
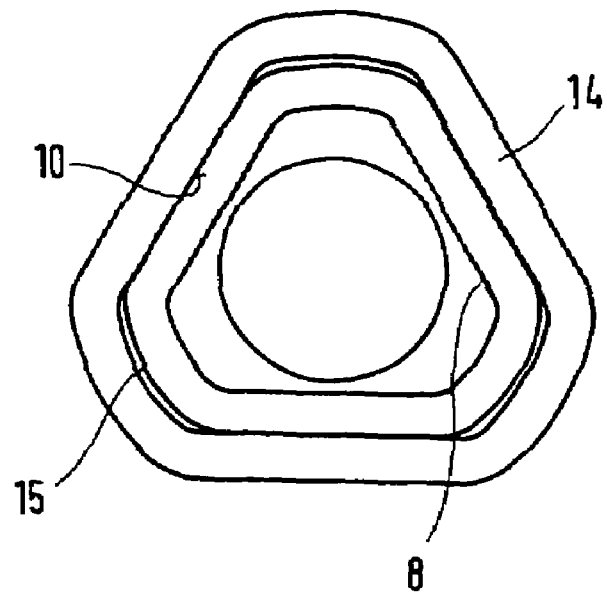
FIG. 3 shows the steering spindle arrangement from FIG. 2 in a cross-sectional illustration.

According to FIGS. 2 and 3, the ends 4 and 5 have a cross section which differs from the circular shape, in particular a polygonal shape, forming a form-fitting connection acting in the circumferential direction. The two figures show, in a rough approximation, a triangular shape of the expansion of the end 4 and of the end 5. Although it is possible for the walls 9 and 10 of the two ends 4 and 5 only to bear locally against each other at one or more points, it is advantageous for the walls 9 and 10 of the ends 4 and 5 to bear against each other in a play-free manner over the entire circumference, thereby resulting in a more uniform distribution of force so as to ensure that a defined displacement of the components 2 and 3 relative to each other reliably takes place if there is an axial impact on the steering spindle, on the one hand, and so as to avoid local, wear-promoting and failure-prone component loads during transmission of the steering torque, on the other hand.

The mentioned, cone-like section 11 of the outer end 5 of the component 3 lies outside the region of the press fit and is axially spaced apart from the end edge 12 of the inner end 4. The provision of a conical section 11 enables the force profile to be advantageously influenced in terms of safety in the event of an axial, crash-induced impact at the end of the displacement path. At the end of the displacement path, the component 2 runs with the end edge 12 of its end 4 onto the inner wall 13 of the conical section 11, which leads to a rise in the displacement force. In the transition of the triangle shape of the outer component 3 into the cone, the end edge 12 first of all encounters the circumferential regions of this intermediate shape, at which the flanks of the triangle do not peter out. On further displacement of the component 2, these partial contact zones merge into a closed contact zone with an approximately circular shape, as a result of which the displacement force greatly increases. Owing to the radial expansion achieved in the process of the outer component 3, kinetic energy of the component 2 is converted to a considerable extent into deformation energy. The influencing of the characteristics of the displacement force profile can furthermore be varied by beveling or rounding the end edge 12 of the inner end 4 as required. The decisive advantage in shaping the end edge 12 and the conical section 11 resides essentially in the fact that a hard end stop, i.e., a spontaneous, very steep rise in the displacement force and therefore a high, sudden load on the driver in the event of an impact, can be avoided.

In order to produce a steering spindle arrangement 1 of this type, the component 2 is plugged with its end 4 into the end 5 of the component 3 with play in such a manner that a displacement path remains in the component 3 for the component 2 and a short overlapping zone of the ends 4 and 5 is produced. In this case, the beveling of the end edge 12 is advantageous, since it acts as a centering aid when threading the end 4 into the end 5. The overlap means that the entire component has a double wall in this zone, the double wall producing particularly high flexural rigidity at this point. In order to form the frictional connection, the walls 9 and 10 of the ends 4, 5 of the two components 2, 3 are pressed together. This advantageously takes place by means of fluidic internal high pressure, with an expansion lance, which is connected to a fluid high pressure generator and has an axial hole and at least one transverse hole opening into an annular duct, sealed by radial seals, on the lance casing, is pushed into the hollow component 2, with the result that the annular duct comes to lie at the axial location of the expansion 8 which is to be produced. Pressurized fluid is then introduced via the holes and the end 4 of the component 2 is partially pressurized—in the zone between the two radial seals. As a consequence of this, the end 4 expands radially on all sides there as anticipated and is pressed against the wall 10 of the outer component 3. A prerequisite of the frictional connection which is obtained is that the outer component 3 consists of a material having a higher elasticity limit than the inner component 2. In this manner, after relief of the high pressure of the fluid and relaxation of the elastic deformation part of the two components 2 and 3, a state of equilibrium arises which is based on a positive radial tensile stress of the component 3 and on a negative radial tensile stress of the component 2. Put in simplified terms, the press fit is formed by plastic expansion of the inner end 4 and by elastic, resilient deformation of the outer end 5. Owing to the triangular shape of the end 5 of the outer component, which shape differs from a circular shape, the material, which is subjected to internal high pressure, of the component 2 first of all arrives at the flanks 14 of the component 3 producing a defined axial force on a defined surface with an adjustable contact pressure for lasting, supporting contact and then flows into the corners 15 of the end 5 where it is shaped. This gives rise in the tangential direction to a form-fitting connection which maximizes the torque which can be transmitted, whereas only a frictional connection is formed in the axial direction, by the component 2 pressing against the flanks 14 of the component 3. By adaptation of the process parameters when charging with internal high pressure, such as the length of the joining zone, level and holding time of the joining pressure and the selection of the materials used for the components, the axial displacement force can be changed in a defined manner. The flowing of the material into the corners 15 of the end 5 is not absolutely necessary. The ends 4 and 5 may be pre-processed by rotary swaging in such a manner that this is no longer necessary. Even relatively small displacement forces can therefore be set and nevertheless high steering moments can be transmitted at the same time.

With the transverse press connection produced, another shape factor enters in the calculation of the torque which can be transmitted as a parameter which takes the form-fitting connection in the tangential direction into consideration. In tests with the present triangular profile, shape factors of the order of magnitude of 13 have been achieved, which signifies that the torque which can be transmitted is approximately 13 times higher than the torque which can be transmitted by a circular cylindrical transverse press connection. Even higher values are conceivable for the shape factors if the material combinations of the components 2 and 3, the profile shapes, joining parameters, etc., are changed in a suitable manner. Owing to this fact, the use of the internal high pressure deformation technique for obtaining the press connection can be used particularly readily, since it can be used to control the process parameters in a simple manner allowing very good monitoring and therefore permits a press connection which can be reproduced and preselected in a defined manner in terms of the force ratios and the exact positioning of the components 2 and 3 with respect to each other. This is particularly suitable for steering spindle arrangements of this type, since high demands are placed on the torque which can be transmitted with a relatively small, axial displacement force which, at the same time, can be set precisely. This is the case in particular in the case of safety steering spindles which, in the case of a vehicle impact, have to absorb crash energy with a defined, axial displacement force. Owing to the placing of the material of the component 2 in the region of the expansion 8 against the wall 10 of the end 5 of the component 3 in a manner matching the contours, manufacturing tolerances of the two components 2 and 3, which tolerances due to the strong dependence of the axial force on the quality of the contact surfaces of the components 2, 3 result in high axial force dispersions in the case of conventional safety steering spindles and therefore in a very inexact assessment of the crash behaviour of the steering spindle, so that complicated refinishing work is required, are extremely advantageously no longer significant.

Tests have also shown here that a level of force of this type can be set relatively precisely and simply within the method-induced limits by the process parameters, that the dispersion of the level of force with the same process parameters is surprisingly small, and in that the force/displacement profile with a slight and virtually linear rise is readily suitable for dissipating crash energy.

The invention claimed is:

1. A steering spindle arrangement, comprising:
    a first component remote from a steering wheel and having an end with a wall;
    a second component near the steering wheel having a first end with a wall and a second end, wherein the first end of the second component has a largest diameter of the second component;
    wherein the first component end and the first end of the second component are frictionally engaged together and wherein the wall of the end of the first component and the wall of the first end of the second component lie directly on each other in a press fit over a region of the frictional engagement;
    wherein the second end of the second component has a longitudinal section which tapers in a cone-like manner, and wherein the tapered second end cone-like section is spaced apart axially from the press fit by a portion of the first end of the second component having the largest diameter;
    and wherein the end of the first component is engageable with an inner wall of the tapered second end cone-like section of the second component at an end of a displacement path of the first component within the second component.

2. The steering spindle arrangement according to claim 1, wherein the first and second components are of tubular design with a circular cross-section.

3. The steering spindle arrangement according to claim 1, wherein both the first and second components are hollow, and wherein at least the end of the first component and the first end of the second component have a polygonal shape cross-section.

4. The steering spindle arrangement according to claim 1, wherein the walls of the ends bear against each other in a play-free manner over their full extent.

5. The steering spindle arrangement according to claim 1, wherein the press fit is formed by plastic expansion of an inner wall and by elastic, resilient deformation of an outer wall.

6. The steering spindle arrangement according to claim 5, wherein the inner wall is beveled or rounded at an end edge.

7. A method for producing a steering spindle arrangement, comprising the steps of:
    frictionally connecting a first component to a second component by inserting an end of the first component into a first end of the second component and pressing a wall of the end of the first component against a wall of the first end of the second component to form a press fit over a region of the frictional connection, wherein the first end of the second component has a largest diameter of the second component; and
    axially positioning the end of the first component from a section of a second end of the second component, the section tapering in a cone-like manner and spaced apart axially from the press fit by a portion of the first end of the second component having the largest diameter, wherein the end of the first component is engageable with an inner wall of the tapered second end cone-like section of the second component at an end of a displacement path of the first component within the second component.

8. The method according to claim 7, wherein the end of the first component and the first end of the second component are connected to each other in a form-fitting manner when frictionally connected together.

9. The method according to claim 7, wherein the first component is hollow and is expanded by fluidic internal high pressure and is pressed onto the wall of the second component, the second component being expanded elastically and the first component being expanded plastically.

* * * * *